US012703608B2

(12) United States Patent
Wang et al.

(10) Patent No.: US 12,703,608 B2
(45) Date of Patent: Aug. 11, 2026

(54) AUTOMATIC CONVEYOR DEVICE

(71) Applicant: Otis Elevator Company, Farmington, CT (US)

(72) Inventors: Wei Wang, Shanghai (CN); Ran Li, Shanghai (CN); Cesar Augusto Belchior de Carvalho, São Bernardo do Campo (BR); Jun Ma, Hangzhou (CN); Baoyu Wang, Haining (CN); YiSug Kwon, Farmington, CT (US); Zhaoxia Hu, Hangzhou (CN); Jing Xia, Hangzhou (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 50 days.

(21) Appl. No.: 18/802,383

(22) Filed: Aug. 13, 2024

(65) Prior Publication Data

US 2025/0059003 A1 Feb. 20, 2025

(30) Foreign Application Priority Data

Aug. 14, 2023 (CN) ......................... 202311021534.8

(51) Int. Cl.
*B66B 27/00* (2006.01)
*B66B 23/22* (2006.01)
(Continued)

(52) U.S. Cl.
CPC ............ *B66B 27/00* (2013.01); *B66B 23/225* (2013.01); *B66B 29/06* (2013.01); *B66B 29/08* (2013.01); *B66B 29/00* (2013.01)

(58) Field of Classification Search
CPC ....... B66B 23/225; B66B 27/00; B66B 29/06; B66B 29/08; B66B 29/00
(Continued)

(56) References Cited

U.S. PATENT DOCUMENTS 4,798,274 A * 1/1989 Saito .................... B66B 23/225 198/324
5,782,330 A * 7/1998 Mehlert .................. B66B 27/00 198/324
(Continued)

FOREIGN PATENT DOCUMENTS

CN 101389902 A 3/2009
CN 202829255 U 3/2013
(Continued)

OTHER PUBLICATIONS

European Search Report for Application No. 24193969.3, Issued Jan. 17, 2025, 13 Pages.

*Primary Examiner* — James R Bidwell
(74) *Attorney, Agent, or Firm* — CANTOR COLBURN LLP

(57) ABSTRACT

An automatic conveyor device including an entrance platform footboard, an exit platform footboard, and a series of steps running in a loop between the entrance platform footboard and the exit platform footboard; a first comb plate and a second comb plate respectively connected to the entrance platform footboard and the exit platform footboard through a comb support plate; and a first warning device disposed in the vicinity of the entrance platform footboard or the exit platform footboard, where the first warning device includes a projection device that projects a light beam along a width direction in the vicinity of the first comb plate or the second comb plate.

17 Claims, 12 Drawing Sheets

(51) Int. Cl.
*B66B 29/00* (2006.01)
*B66B 29/06* (2006.01)
*B66B 29/08* (2006.01)

(58) Field of Classification Search
USPC .................................................. 198/324, 325
See application file for complete search history.

(56) References Cited

U.S. PATENT DOCUMENTS

| | | | | |
|---|---|---|---|---|
| 6,988,607 | B2 * | 1/2006 | Blondiau | B66B 25/00 198/324 |
| 7,134,539 | B2 * | 11/2006 | Kim | B66B 31/02 198/324 |
| 7,775,339 | B2 * | 8/2010 | Ogimura | B66B 29/02 198/324 |
| 2023/0112276 | A1 | 4/2023 | Wagenleitner | |

FOREIGN PATENT DOCUMENTS

| | | | | | |
|---|---|---|---|---|---|
| CN | 103318739 | A | | 9/2013 | |
| CN | 104058325 | A | | 9/2014 | |
| CN | 105752813 | A | | 7/2016 | |
| CN | 106144871 | A | | 11/2016 | |
| CN | 107601248 | A | | 1/2018 | |
| CN | 107628520 | A | | 1/2018 | |
| CN | 108358029 | A | | 8/2018 | |
| CN | 210558830 | U | | 5/2020 | |
| CN | 112110319 | A | | 12/2020 | |
| CN | 214243409 | U | | 9/2021 | |
| CN | 218642237 | U | | 3/2023 | |
| DE | 112007000444 | T5 | | 1/2009 | |
| DE | 202009017336 | U1 | | 5/2010 | |
| JP | 2003246576 | A | | 9/2003 | |
| JP | 2003306288 | A | | 10/2003 | |
| JP | 2004001926 | A | | 1/2004 | |
| JP | 2006082895 | A | | 3/2006 | |
| JP | 2006193241 | A | | 7/2006 | |
| JP | 2012006669 | A | | 1/2012 | |
| JP | 6949233 | B2 | * | 10/2021 | B66B 23/04 |
| JP | 7059902 | B2 | | 4/2022 | |
| JP | 2022077064 | A | | 5/2022 | |
| KR | 20100064123 | A | | 6/2010 | |
| KR | 20100082954 | A | | 7/2010 | |
| KR | 101008781 | B1 | | 1/2011 | |
| KR | 101614540 | B1 | | 4/2016 | |
| WO | WO-2021190965 | A1 | * | 9/2021 | B66B 23/225 |

* cited by examiner

AUTOMATIC CONVEYOR DEVICE

FOREIGN PRIORITY

This application claims priority to Chinese Patent Application No. 202311021534.8, filed Aug. 14, 2023, and all the benefits accruing therefrom under 35 U.S.C. § 119, the contents of which in its entirety are herein incorporated by reference.

TECHNICAL FIELD OF INVENTION

The present invention relates to the field of automatic conveyor devices, and in particular to a warning device for the area between the platform footboard and the steps of an automatic conveyor device, and an automatic conveyor device with the warning device.

BACKGROUND OF THE INVENTION

Automatic conveyor devices such as escalators and moving walkways are commonly used to convey passengers between two fixed platforms. For automatic conveyor devices, the area between the moving component and the stationary component, such as the area between the steps in cyclic motion and the fixed platform, is a comparative dangerous area. In the prior art, the fixed platform is generally provided with a comb plate at the intersection with the steps, where the front end of the comb plate has a plurality of comb teeth that are matched with a plurality of grooves on the surface of the steps. Sensors are provided inside the comb plate, which are triggered when external objects are trapped and cause the comb plate to tilt, causing the automatic conveyor device to come to an abrupt stop, which will bring danger and cause damage to the automatic conveyor device.

The existing safety measures usually include passive safety devices. As more passengers focus on checking their mobile phones when using automatic conveyor devices, alerting passengers to potential hazards in an active manner can more effectively to avoid accidents. Therefore, there is a demand for warning devices that can provide danger warnings to passengers.

SUMMARY OF THE INVENTION

The object of the present application is to solve or at least alleviate the problems existing in the prior art.

According to one aspect, an automatic conveyor device is provided, comprising: an entrance platform footboard, an exit platform footboard, and a series of steps running in a loop between the entrance platform footboard and the exit platform footboard; a first comb plate and a second comb plate respectively connected to the entrance platform footboard and the exit platform footboard through a comb support plate; and a first warning device disposed in the vicinity of the first comb plate or the second comb plate, where the first warning device comprises a projection device that projects a light beam along a width direction in the vicinity of the comb plate of the entrance platform footboard or the exit platform footboard.

Optionally, in an embodiment of the automatic conveyor device, the first warning device is disposed in the vicinity of the entrance platform footboard, and the automatic conveyor device also comprises a second warning device disposed in the vicinity of the exit platform footboard.

Optionally, in an embodiment of the automatic conveyor device, the automatic conveyor device further comprises: a first sensor that monitors passengers boarding the automatic conveyor device from the entrance platform footboard; and a controller configured to activate the first warning device based on a signal from the first sensor, and activate the second warning device after a first delay time, where the first delay time is determined based on the distance between the entrance platform footboard and the exit platform footboard and the running speed of the steps; or, the controller is configured to activate the first warning device based on a signal from the first sensor, and activate the second warning device based on a signal from the second sensor, where the second sensor monitors passengers about to leave the automatic conveyor device from the exit platform footboard.

Optionally, in an embodiment of the automatic conveyor device, the first warning device and/or the second warning device comprise projection devices disposed at handrail baffles and/or skirts on both sides.

Optionally, in an embodiment of the automatic conveyor device, the handrail baffles on both sides are made of transparent materials, and the projection devices, when activated, project a first longitudinal light beam and a second longitudinal light beam extending vertically along the handrail baffles on both sides, and a transverse light beam connected between the first longitudinal light beam and the second longitudinal light beam spanning the comb plate, where the first longitudinal light beam, the second longitudinal light beam and the transverse light beam jointly form a frame-shaped light beam gate.

Optionally, in an embodiment of the automatic conveyor device, the projection devices include a pair of high projection lights located at the top of the handrail baffles on both sides and a pair of low projection lights located at the skirts on both sides, where the pair of high projection lights project the first longitudinal light beam and the second longitudinal light beam, respectively, and the pair of low projection lights jointly project the transverse light beam.

Optionally, in an embodiment of the automatic conveyor device, the first warning device and/or the second warning device also comprise a display device disposed at the handrail baffle, wherein when the first warning device and/or the second warning device are activated, the display device plays an animation consisting of at least three frames in a loop, where the animation displays the action of a foot stepping across the comb plate.

Optionally, in an embodiment of the automatic conveyor device, in the first frame of the animation, the foot is on the ground and in front of the comb plate; in the second frame of the animation, the foot is lifted and substantially aligned with the comb plate; and in the third frame of the animation, the foot is on the ground and behind the comb plate.

Optionally, in an embodiment of the automatic conveyor device, the first warning device and/or the second warning device further comprise a light strip with text warnings located on the comb plate or on the handrail baffles on both sides of the comb plate, where when the first warning device and/or the second warning device are activated, the light strip with text warnings is illuminated or blinking.

Optionally, in an embodiment of the automatic conveyor device, the first warning device and/or the second warning device further comprise a series of color-changing lights disposed in rows on the comb plate, where when the first warning device and/or the second warning device are activated, the series of color-changing lights are illuminated with color changing at regular intervals.

Optionally, in an embodiment of the automatic conveyor device, the first warning device and/or the second warning device further comprise a screen disposed on the comb plate along the width of the comb plate, where the screen displays static or scroll text warnings when turned on.

Optionally, in an embodiment of the automatic conveyor device, the first warning device and/or the second warning device comprise an embedded display screen embedded in the entrance platform footboard or the exit platform footboard, the embedded display screen being surrounded by a ring light array, where when the first warning device and/or the second warning device are activated, the embedded display screen is illuminated with text warnings displayed, and the ring light array is illuminated or blinking.

Optionally, in an embodiment of the automatic conveyor device, the first warning device and/or the second warning device comprise a sound prompt device, where when the first warning device and/or the second warning device are activated, the sound prompt device broadcasts prompt messages.

According to another aspect, an automatic conveyor device is provided, comprising: an entrance platform footboard, an exit platform footboard, and a series of steps running in a loop between the entrance platform footboard and the exit platform footboard; a first comb plate and a second comb plate respectively connected to the entrance platform footboard and the exit platform footboard through a comb support plate; and a first warning device disposed in the vicinity of the entrance platform footboard or the exit platform footboard, the first warning device comprising a display device disposed on a handrail baffle on one side of the first comb plate or the second comb plate, where when the first warning device is activated, the display device plays an animation consisting of at least three frames in a loop, the animation displaying the action of a foot stepping across the comb plate.

Optionally, in an embodiment of the automatic conveyor device, in the first frame of the animation, the foot is on the ground and in front of the comb plate; in the second frame of the animation, the foot is lifted and substantially aligned with the comb plate; and in the third frame of the animation, the foot is on the ground and behind the comb plate.

Optionally, in an embodiment of the automatic conveyor device, the first warning device is disposed in the vicinity of the entrance platform footboard, the automatic conveyor device further comprising: a second warning device disposed in the vicinity of the exit platform footboard; a first sensor that monitors passengers boarding the automatic conveyor device from the entrance platform footboard; and a controller configured to activate the first warning device based on a signal from the first sensor, and activate the second warning device after a first delay time, wherein the first delay time is determined based on the distance between the entrance platform footboard and the exit platform footboard and the running speed of the steps; or, the controller is configured to activate the first warning device based on a signal from the first sensor, and activate the second warning device based on a signal from the second sensor, where the second sensor monitors passengers about to leave the automatic conveyor device from the exit platform footboard.

Optionally, in an embodiment of the automatic conveyor device, the first warning device and/or the second warning device comprise: projection devices that project light beams along the width direction in the vicinity of a comb plate of the entrance platform footboard or the exit platform footboard, wherein the projection devices are disposed at handrail baffles and/or skirts on both sides, and the handrail baffles on both sides are made of transparent materials, where the projection devices, when activated, project a first longitudinal light beam and a second longitudinal light beam extending vertically along the handrail baffles on both sides, and a transverse light beam connected between the first longitudinal light beam and the second longitudinal light beam spanning the comb plate, the first longitudinal light beam, the second longitudinal light beam, and the transverse light beam jointly forming a frame-shaped light beam gate; and/or a light strip with text warnings located on the comb plate or on the handrail baffles on both sides of the comb plate, where when the first warning device and/or the second warning device are activated, the light strip with text warnings is illuminated or blinking; and/or a series of color-changing lights disposed in rows on the comb plate, where when the first warning device and/or the second warning device are activated, the series of color-changing lights are illuminated with color changing at regular intervals; and/or a screen disposed on the comb plate along the width of the comb plate, where the screen displays static or scroll text warnings when turned on; and/or an embedded display screen embedded in the entrance platform footboard or the exit platform footboard, the embedded display screen being surrounded by a ring light array, where when the first warning device and/or the second warning device are activated, the embedded display screen is illuminated with text warnings displayed, and the ring light array is illuminated or blinking; and/or a sound prompt device that broadcasts prompt messages when the first warning device and/or the second warning device are activated.

According to another aspect, an automatic conveyor device is provided, comprising: an entrance platform footboard, an exit platform footboard, and a series of steps running in a loop between the entrance platform footboard and the exit platform footboard; a first comb plate and a second comb plate respectively connected to the entrance platform footboard and the exit platform footboard through a comb support plate; and a first warning device disposed in the vicinity of the entrance platform footboard; a second warning device disposed in the vicinity of the exit platform footboard; a first sensor that monitors passengers boarding the automatic conveyor device from the entrance platform footboard; and a controller configured to activate the first warning device based on a signal from the first sensor, and activate the second warning device after a first delay time, where the first delay time is determined based on the distance between the entrance platform footboard and the exit platform footboard and the running speed of the steps.

Optionally, in an embodiment of the automatic conveyor device, the first warning device and/or the second warning device comprises: projection devices that project light beams along the width direction in the vicinity of the first comb plate and/or the second comb plate, wherein the projection devices are disposed at handrail baffles and/or skirts on both sides, and the handrail baffles on both sides are made of transparent materials, where the projection devices, when activated, project a first longitudinal light beam and a second longitudinal light beam extending vertically along the handrail baffles on both sides, and a transverse light beam connected between the first longitudinal light beam and the second longitudinal light beam spanning the comb plate, the first longitudinal light beam, the second longitudinal light beam, and the transverse light beam jointly forming a frame-shaped light beam gate.

Optionally, in an embodiment of the automatic conveyor device, the first warning device and/or the second warning device comprise: a display device disposed on the handrail baffle on one side of the first comb plate and/or the second comb plate, where when the first warning device is activated, the display device plays an animation consisting of at least three frames in a loop, the animation displaying the action of a foot stepping across the comb plate, wherein, in the first frame of the animation, the foot is on the ground and in front of the comb plate; in the second frame of the animation, the foot is lifted and substantially aligned with the comb plate; and in the third frame of the animation, the foot is on the ground and behind the comb plate.

The device according to the present invention provides danger warnings in the vicinity of the comb plates at both ends of the automatic conveyor device, so as to improve the safety of the automatic conveyor device.

BRIEF DESCRIPTION OF THE DRAWINGS

With reference to the accompanying drawings, the disclosure of the present application will become easier to understand. Those skilled in the art would easily understand that these drawings are for the purpose of illustration, and are not intended to limit the protection scope of the present application. In addition, in the figures, similar numerals are used to denote similar components, where.

DETAILED DESCRIPTION OF THE INVENTION

Figure 1:
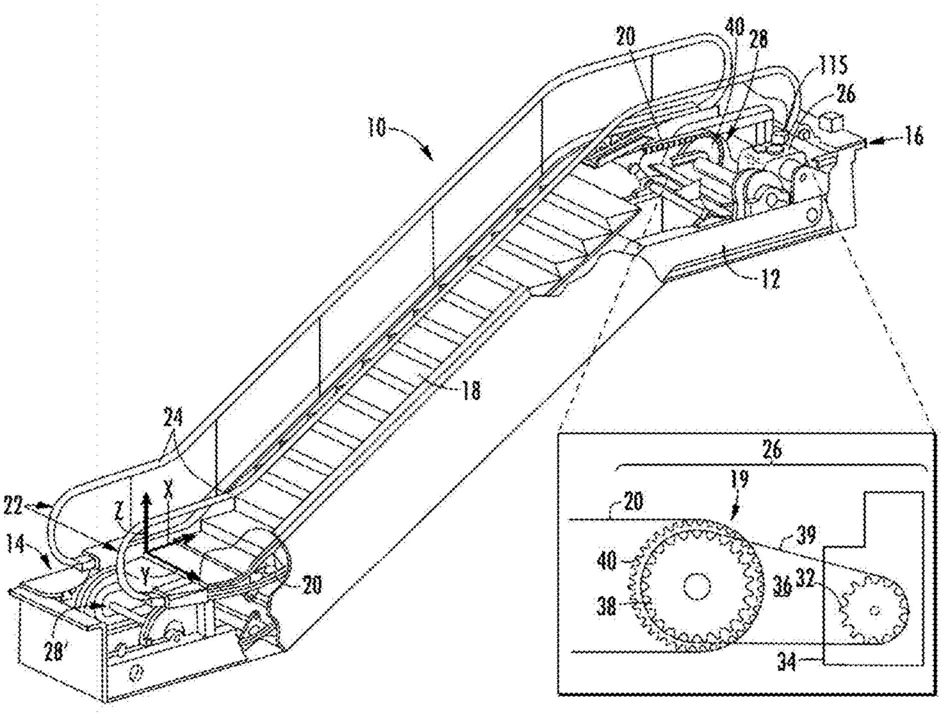
FIG. 1 shows a schematic diagram of an escalator device.

FIG. 1 illustrates an escalator 10. It should become apparent in the ensuing description that the invention is applicable to other passenger conveyor systems, such as moving walks. The escalator 10 generally includes a truss 12 extending between a lower landing 14 and an upper landing 16. A plurality of sequentially connected steps or step boards 18 are connected to a step chain 20 and travel through a closed loop path within the truss 12. A pair of balustrades 22 includes moving handrails 24. A drive machine 26, or drive system, is typically located in a machine space 28 under the upper landing 16; however, an additional machine space 28' can be located under the lower landing 14. The drive machine 26 is configured to drive the footboards 18 and/or handrails 24 through the step chain 20. The drive machine 26 operates to move the footboards 18 in a chosen direction at a desired speed under normal operating conditions.

The footboards 18 make a 180 degree heading change in a turn-around area 19 located under the lower landing 14 and upper landing 16. The footboards 18 are pivotally attached to the step chain 20 and follow a closed loop path of the step chain 20, running from one landing to the other, and back again.

The drive machine 26 includes a first drive member 32, such as motor output sheave, connected to a drive motor 34 through a belt reduction assembly 36 including a second drive member 38, such as an output sheave, driven by a tension member 39, such as an output belt. The first drive member 32 in some embodiments is a driving member, and the second drive member 38 is a driven member.

As used herein, the first drive member 32 and/or the second drive member 38, in various embodiments, may be any type of rotational device, such as a sheave, pulley, gear, wheel, sprocket, cog, pinion, etc. The tension member 39, in various embodiments, can be configured as a chain, belt, cable, ribbon, band, strip, or any other similar device that operatively connects two elements to provide a driving force from one element to another. For example, the tension member 39 may be any type of interconnecting member that extends between and operatively connects the first drive member 32 and a second drive member 38. In some embodiments, as shown in FIG. 1, the first drive member 32 and the second drive member may provide a belt reduction. For example, first drive member 32 may be approximately 75 mm (2.95 inches) in diameter while the second drive member 38 may be approximately 750 mm (29.53 inches) in diameter. The belt reduction, for example, allows the replacement of sheaves to change the speed for 50 or 60 Hz electrical supply power applications, or different step speeds. However, in other embodiments the second drive member 38 may be substantially similar to the first drive member 32.

As noted, the first drive member 32 is driven by drive motor 34 and thus is configured to drive the tension member 39 and the second drive member 38. In some embodiments, the second drive member 38 may be an idle gear or similar device that is driven by the operative connection between the first drive member 32 and the second drive member 38 by means of tension member 39. The tension member 39 travels around a loop set by the first drive member 32 and the second drive member 38, which hereinafter may be referred to as a small loop. The small loop is provided for driving a larger loop which consists of the step chain 20, and is driven by an output sheave 40, for example. Under normal operating conditions, the tension member 39 and the step chain 20 move in unison, based upon the speed of movement of the first drive member 32 as driven by the drive motor 34.

The escalator 10 also includes a controller 115 that is in electronic communication with the drive motor 34. The controller 115 may be located, as shown, in the machine space 28 of the escalator 10 and is configured to control the operation of the escalator 10. For example, the controller 115 may provide drive signals to the drive motor 34 to control the acceleration, deceleration, stopping, etc. of the footboards 18 through the step chain 20. The controller 115 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware disposed homogenously or heterogeneously. The memory may be but is not limited to a random access memory (RAM), read only memory (ROM), or other electronic, optical, magnetic or any other computer readable medium.

Although described herein as a particular escalator drive system and particular components, this is merely exemplary, and those of skill in the art will appreciate that other escalator system configurations may operate with the invention disclosed herein.

Figure 2:
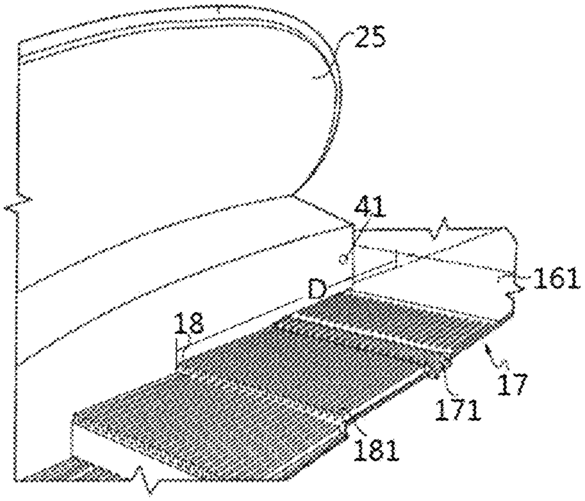
FIG. 2 shows an enlarged view of the area between the steps and the platform of an escalator device.

An automatic conveyor device according to an embodiment of the present invention is described with reference to FIG. 2. The automatic conveyor device comprises: an entrance platform footboard 161, an exit platform footboard 141 (not shown in FIG. 2, the platform footboard corresponding to the lower landing 14), and a series of steps 18 running in a loop between the entrance platform footboard 161 and the exit platform footboard 141. A first comb plate is connected to the entrance platform footboard through a comb support plate, and a second comb plate is connected to the exit platform footboard through a comb support plate. Specifically, a first comb plate 171 is connected to the entrance platform footboard 161 through a comb support plate 17. In the text, the area D in the vicinity of the comb plate 171 can be defined as an area that extends forward and backward from the comb plate 171 by the length of a step 18, respectively. A first warning device and an optional second warning device can be disposed in the vicinity of the comb plates of the entrance platform footboard and the exit platform footboard. The first warning device and the second warning device can be in the form of warning devices based on sound, light, or electricity and so on, and the first warning device and the second warning device can include an off state and an activated state. In the off state, the first and second warning devices are turned off or in a sleep state, so there is basically no energy consumption. In the activated state, the first and second warning devices operate in various ways as will be explained in detail below. The warning device according to the embodiments of the present invention, by changing from an off state to an activated state, actively alerts passengers, especially passengers who are checking their mobile phones, as this environmental change can make them aware of the dangerous area in the vicinity of the comb plate. In addition, a first sensor 41 can be disposed to detect passengers entering the automatic conveyor device from the entrance platform footboard 161. The steps of the automatic conveyor device shown in FIG. 2 move from the entrance platform footboard 161 to the exit platform footboard 141. The first sensor 41 can be disposed at the entrance platform footboard 161, for example, at the skirt in vicinity of the comb plate 171. When a passenger enters the automatic conveyor device from the entrance platform footboard 161, the first sensor 41 senses the passenger and sends a signal to the controller, which activates the first warning device based on the signal from the first sensor 41. In some embodiments, the first sensor 41 may be a sensor based on light, such as an infrared sensor, and the like. In alternative embodiments, the sensor 41 may also be configured as a radar sensor or a camera, and the like.

Figure 3:
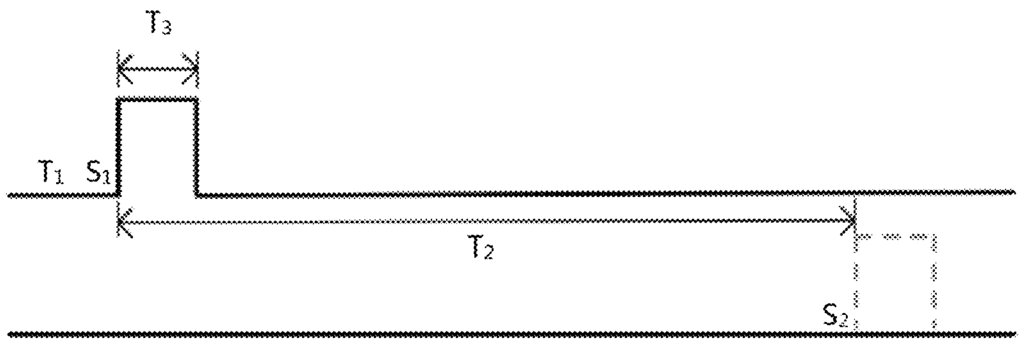
FIG. 3 shows the start signal of a warning device according to an embodiment of the present invention.

As shown in FIG. 3, in some embodiments of the present invention, the controller is configured to activate the first warning device based on a signal sent by the sensor at time point T1, that is, the controller sends a first control signal S1 to the first warning device (i.e., the first warning device at the entrance platform footboard in this embodiment) to activate the first warning device, and to activate the second warning device after a first delay time T2, i.e., to send a second control signal S2 to the second warning device at the exit platform footboard to activate the second warning device. The first delay time T2 can be determined based on the distance between the entrance platform footboard 161 and the exit platform footboard 141, and the running speed of steps 18. In some embodiments, the first delay time T2 may also vary based on passenger's movement on the steps 18, such as whether the passenger is standing or walking. More specifically, during operation, the first warning device in the vicinity of the entrance platform footboard is activated when the passenger step on the steps from the entrance platform footboard 161, and the time when the passenger reach the vicinity of the exit platform footboard can be estimated, based on which the second warning device in the vicinity of the exit platform footboard can be activated.

Figure 4:
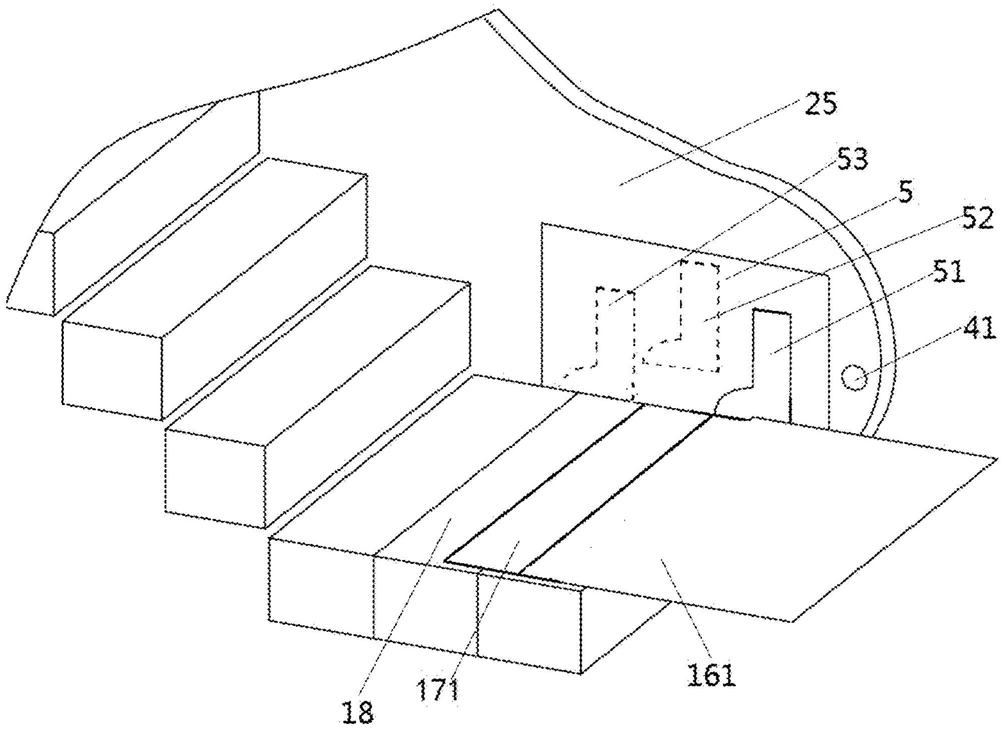
FIG. 4 shows a warning device according to an embodiment of the present invention.

Although the scheme of a first sensor and a first delay time is adopted in the above embodiment, in alternative embodiments, however, a second sensor can also be disposed in the vicinity of the exit platform footboard, where the second sensor monitors passengers about to leave the automatic conveyor device from the exit platform footboard, and the controller can activate the second warning device based on the second sensor at this point. It should be appreciated that in general, the running directions of the automatic conveyor device can be altered. For example, when the automatic conveyor device runs in the opposite direction, i.e., running upwards, the entrance platform footboard 161 and the exit platform footboard 141 interchange with each other (for example, as shown in FIG. 4, the entrance platform footboard 161 is configured at the lower platform). An automatic conveyor device with both the first sensor and the second sensor can facilitate the automatic conveyor device to run in different directions. As shown in FIG. 3, in some embodiments, the first control signal S1 and the second control signal S2 can be pulse signals, that is, only activating the first and second warning devices with a second delay time T3, such as 30 seconds to 1 minute, etc., if no further control signals are received, the first and second warning devices will return to the off state after the second delay time T3, so as to save energy consumption.

With continued reference to FIG. 4, a warning device according to an embodiment is shown. In some embodiments, the first warning device and/or the second warning device comprise a display device 5 located at the handrail baffle 25. Although in the illustrated embodiment, the display device 5 is only disposed on the handrail baffle 25 on one side, in alternative embodiments, however, the display device 5 can be disposed on the handrail baffles 25 on both sides. The display device 5 plays an animation consisting of at least three frames in a loop, showing the passenger's foot stepping across the comb plate. For example, as shown in the figure, in the first frame 51 of the animation, the foot is on the ground and in front of the comb plate 171; in the second frame 52 of the animation, the foot is lifted and substantially aligned with the comb plate 171; in the third frame 53 of the animation, the foot is on the ground and behind the comb plate 171. The above animation is played in a loop, so as to prompt passengers to step across the comb plate with their feet raised. The animation device provides an interesting escalator riding experience and at the same time attracts the attention of passengers. Under the stimulation of the animation, passengers tend to imitate the animation actions and step across the comb plate 171. The display device 5 can be a simple display device based on LED lights or a liquid crystal display device. The display device 5 can be completely turned off or stationary in the first frame state when no signal is received. In some embodiments, the positions of the first frame 51, second frame 52, and third frame 53 on the display device 5 correspond to the positions where the passenger steps across the comb plate in a proper manner, so as to provide proper instructions. In some embodiments, the display device 5 may play an animation consisting of more frames. Although in the illustrated embodiment, the display device 5 is located in the vicinity of the entrance platform footboard, a similar display device 5 can also be disposed in the vicinity of the exit platform.

Figure 5:
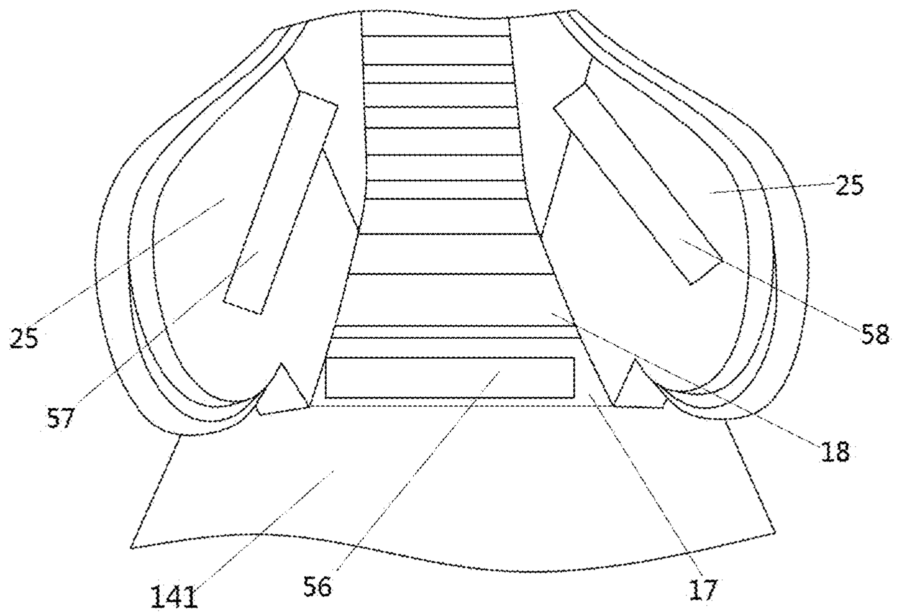
FIG. 5 shows a warning device according to another embodiment of the present invention.

With continued reference to FIG. 5, a warning device according to another embodiment is shown. The first warning device and/or the second warning device may also comprise a light strip 56 with text warnings located on the comb plate or the comb support plate of the entrance platform footboard or the exit platform footboard, or light strips 57, 58 with text warnings disposed on the handrail baffles 25 on both sides in the vicinity of the comb plate or embedded in the handrail baffles 25 (for example, in the case of transparent glass handrail baffles). Text warnings may include, for example, 'Don't Stay', 'Please Step Across', and so on. These light strips 56, 57, and 58 are illuminated or blinking when activated, so that the text warnings become more apparent, thereby prompting passengers to pay attention to this area.

Figure 6:
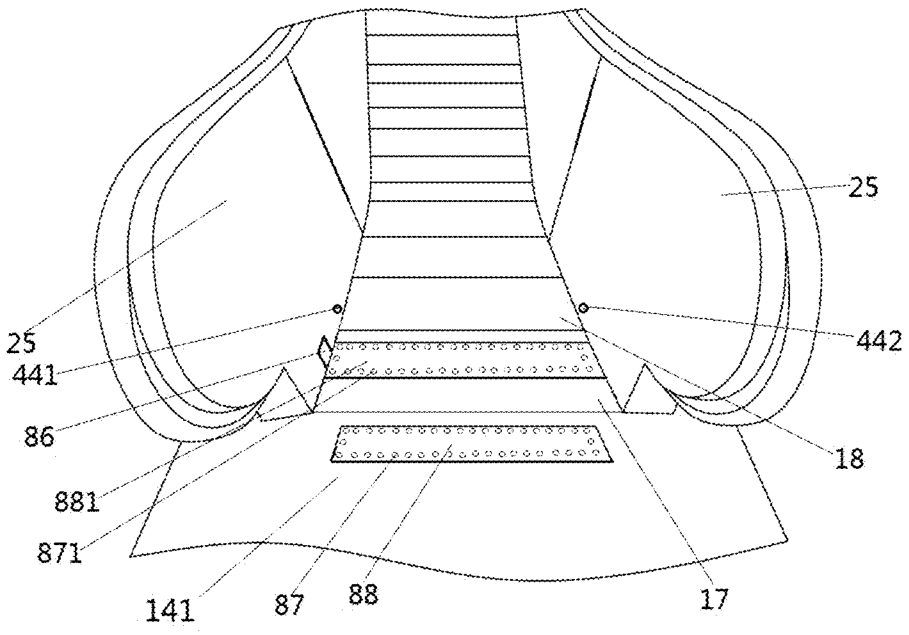
FIG. 6 shows a warning device according to another embodiment of the present invention.

With continued reference to FIG. 6, a warning device according to another embodiment is shown. In this embodiment, the first warning device and/or the second warning device comprise an embedded display screen 881 embedded in the vicinity of the comb plate of the entrance platform footboard or the exit platform footboard, such as embedded in the comb support plate or the platform footboard, where the embedded display screen 881 is surrounded by a ring light array 871. In some embodiments, an embedded display screen 88 and a ring light array 87 can also be directly disposed at the entrance platform footboard 161 or the exit platform footboard 141. When the first warning device and/or the second warning device are activated, the embedded display screens 88, 881 are illuminated with text warnings displayed, and the ring light arrays 87, 871 are illuminated or blinking. In addition, in some embodiments, the first warning device and/or the second warning device comprise a sound prompt device 86, such as a speaker, which broadcasts prompt messages when the first warning device and/or the second warning device are activated. In addition, in the embodiment shown in FIG. 6, the steps also move from the entrance platform footboard 161 to the exit platform footboard 141. However, a second sensor 441, 442 is disposed in the vicinity of the exit platform footboard 141. In this embodiment, the second warning device is activated by a signal from the second sensor rather than based on the first delay time, so that the activation time of the second warning device can be more accurate and not affected by unexpected events. In this embodiment, the second sensor 441, 442 can be a sensor based on infrared light, which includes a light transmitter 441 and a light receiver 442. When the light receiver 442 is blocked, the second sensor sends a signal to the controller, thereby activating the second warning device, which includes embedded display screens 88, 881, ring light arrays 87, 871, and/or a sound prompt device 86. In some embodiments, the second sensor 441, 442 is disposed on the escalator skirts or handrail baffles 25 on both sides.

Figure 7:
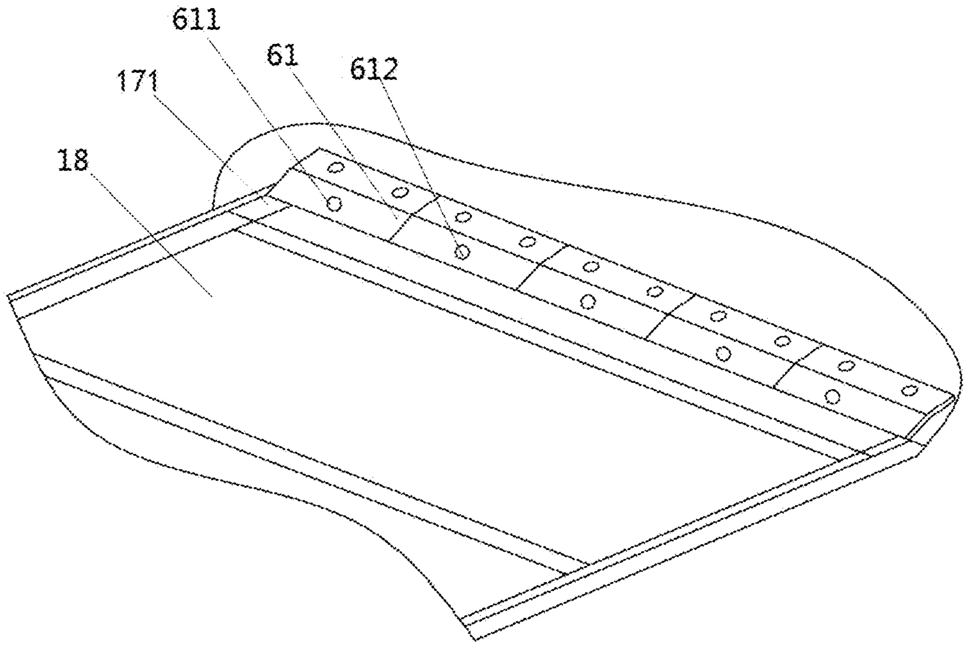
FIG. 7 shows a warning device according to another embodiment of the present invention.

With continued reference to FIG. 7, a warning device according to another embodiment is shown. In some embodiments, the first warning device and/or the second warning device comprise a series of color-changing lights 61 disposed in rows on the comb plate 171 of the entrance platform footboard or the exit platform footboard. When the first warning device and/or the second warning device are activated, the series of color-changing lights are illuminated with color changing at regular intervals. In some embodiments, adjacent first light 611 and second light 612 may have different colors. For example, initially, the first light 611 is red and the second light 612 is green, and during switching, the first light 611 turns to green and the second light 612 turns to red.

Figure 8:
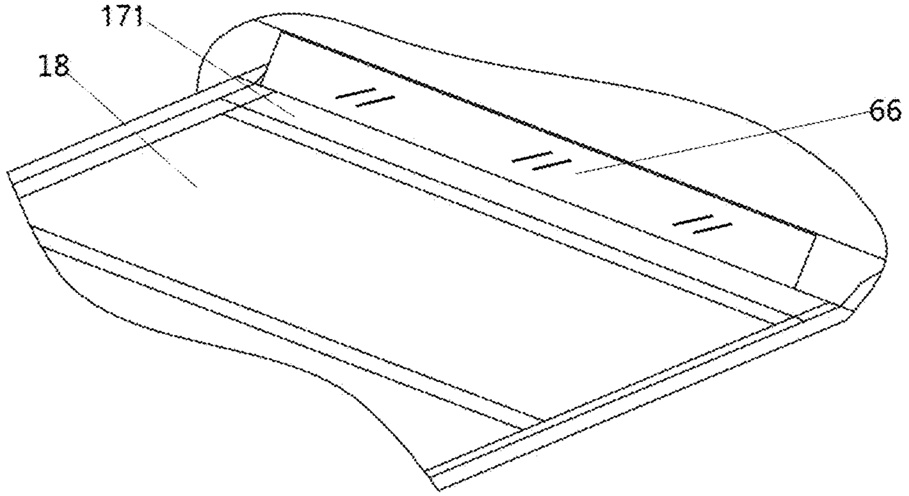
FIG. 8 shows a warning device according to another embodiment of the present invention.

With continued reference to FIG. 8, a warning device according to another embodiment is shown. In this embodiment, the first warning device and/or the second warning device comprise a screen 66 with stationary or scroll text warnings spanning the width of the comb plate located on the comb plate 171 of the entrance platform footboard or the exit platform footboard, for example, the screen 66 can be disposed on the comb plate 171. When the first warning device and/or the second warning device are activated, the screen 66 is illuminated with text warnings displayed, such as 'Don't Stand Here'. By arranging lights, screens, and other devices in the vicinity of the comb plate, the positions in the vicinity of the comb plate can become more apparent, thus attracting passengers' attention to avoid potential risks.

Figure 9:
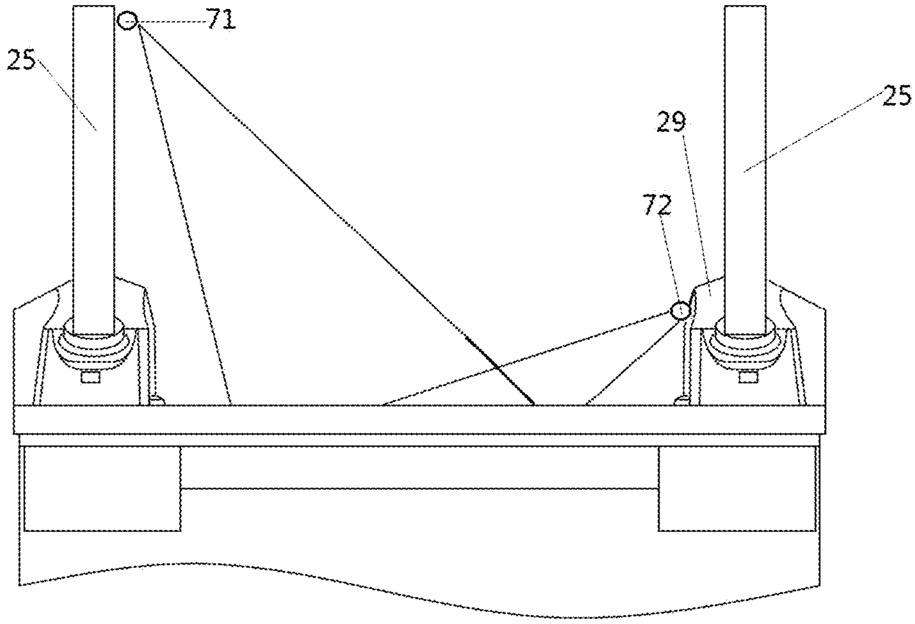
FIGS. 9 and 10 show a warning device according to another embodiment of the present invention.
Figure 10:
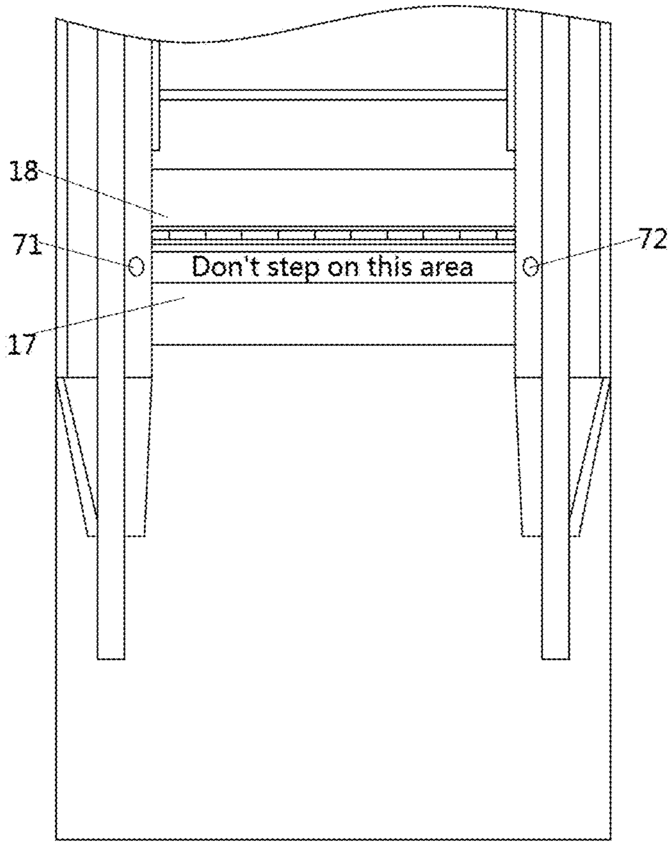

With continued reference to FIGS. 9 to 12, warning devices according to other embodiments are shown. In some embodiments, the first warning device and/or the second warning device comprise projection devices 71, 72 disposed at the handrail baffle 25 and/or skirt 29 in the vicinity of the comb plate. In the embodiments of FIGS. 9 and 10, the projection devices include a first projection light 71 disposed at the top of the handrail baffle 25 on the first side and a second projection light 72 disposed at the skirt 29 on the second side. The first projection light 71 and the second projection light 72 jointly project light beams along the width direction in the vicinity of the comb plate, where the light beams can contain text warnings. For example, static or scroll text warnings are projected on the comb plate, such as 'Don't Step on This Area'. Although a specific arrangement of the projection devices is shown in the illustrated embodiment, in alternative embodiments, however, the projection lights can be disposed in other suitable positions, and any number of projection lights can be used.

Figure 11:
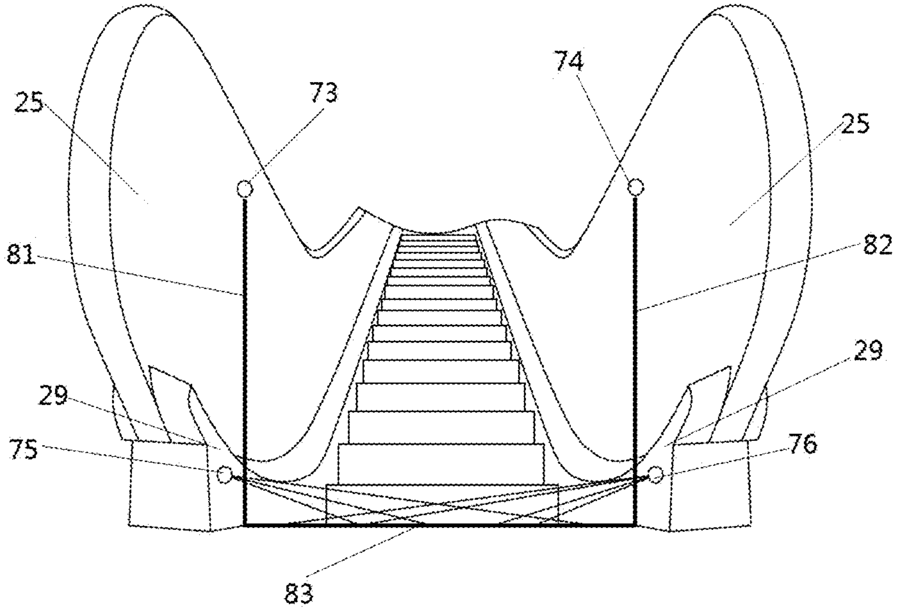
FIGS. 11 and 12 show a warning device according to another embodiment of the present invention.
Figure 12:
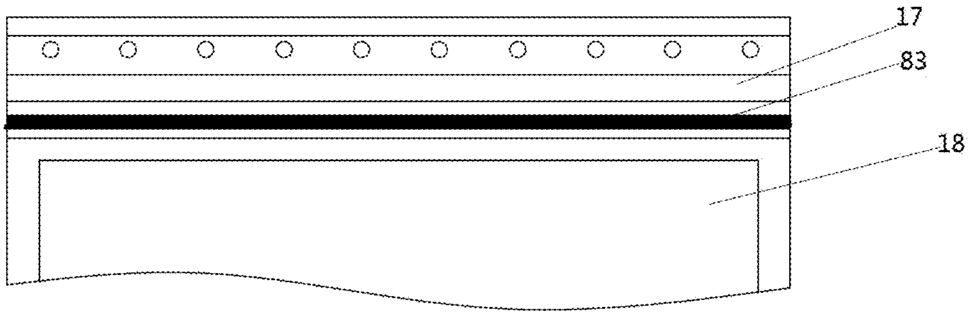

In the embodiments shown in FIGS. 11 and 12, the handrail baffles 25 can be made of transparent materials, such as glass panels, and the projection devices comprise a pair of high projection lights 73, 74 at the top of the handrail baffles 25 on both sides, and a pair of low projection lights 75, 76 at the skirts 29 on both sides. When the high projection lights 73, 74 and low projection lights 75, 76 are turned on, they project a first longitudinal light beam 81 and a second longitudinal light beam 82 extending vertically in the handrail baffles on both sides, and a transverse light beam 83 connecting the first longitudinal light beam 81 and the second longitudinal light beam 82 spanning the comb plate. The first longitudinal light beam 81, the second longitudinal light beam 82, and the transverse light beam 83 are each locate the vicinity of light beams and jointly form a frame-shaped light beam gate located in the vicinity of the comb plate of the entrance platform footboard or the exit platform footboard, thus providing warnings. The projected light beams, especially the frame-shaped light beam gate, makes the entrance and exit of the automatic conveyor device highlighted, while at the same time provides an aesthetic design, functionality, and safety.

It should be appreciated that the warning devices in the aforementioned embodiments can be applied separately or in combination within the same automatic conveyor device without mutual exclusion. For example, the sound prompt device can be applied together with the projection device, animation display screen, etc. to one or both ends of an automatic conveyor device. It should be appreciated that the automatic conveyor device according to the embodiments of the present invention can be configured with the same or different warning devices or combinations of warning devices at both ends. For example, a projection device can be adopted at the entrance end of the automatic conveyor device, and an animation display screen can be adopted at the exit end. It should be appreciated that, in general, the running directions of an automatic conveyor device can be changed. The sensors should be reasonably disposed and the control logic of the controller should be reasonably designed, so as to respond to changes in the running directions of the automatic conveyor device. It should be appreciated that the automatic conveyor device according to the embodiments of the present invention includes but is not limited to escalators and moving walkways.

The specific embodiments described above in the present application are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. An automatic conveyor device, comprising:

an entrance platform footboard, an exit platform footboard, and a series of steps running in a loop between the entrance platform footboard and the exit platform footboard;

a first comb plate and a second comb plate respectively connected to the entrance platform footboard and the exit platform footboard through a comb support plate; and a first warning device disposed in the vicinity of the entrance platform footboard or the exit platform footboard, where the first warning device comprises a projection device that projects a light beam along a width direction in the vicinity of the first comb plate or the second comb plate;

wherein the first warning device is disposed in the vicinity of the entrance platform footboard, and the automatic conveyor device further comprises a second warning device disposed in the vicinity of the exit platform footboard;

wherein the automatic conveyor device further comprises:

a first sensor that monitors passengers boarding the automatic conveyor device from the entrance platform footboard; and a controller configured to activate the first warning device based on a signal from the first sensor, and activate the second warning device after a first delay time, where the first delay time is determined based on a distance between the entrance platform footboard and the exit platform footboard and running speed of the steps; or, the controller is configured to activate the first warning device based on a signal from the first sensor, and activate the second warning device based on a signal from the second sensor, where the second sensor monitors passengers about to leave the automatic conveyor device from the exit platform footboard.

2. The automatic conveyor device according to claim 1, wherein the first warning device and/or the second warning device comprise projection devices disposed at handrail baffles and/or skirts on both sides.

3. The automatic conveyor device according to claim 2, wherein the handrail baffles on both sides are made of transparent materials, and the projection devices, when activated, project a first longitudinal light beam and a second longitudinal light beam extending vertically along the handrail baffles on both sides, and a transverse light beam connected between the first longitudinal light beam and the second longitudinal light beam spanning the comb plate, where the first longitudinal light beam, the second longitudinal light beam and the transverse light beam jointly form a frame-shaped light beam gate.

4. The automatic conveyor device according to claim 3, wherein the projection devices comprise a pair of high projection lights located at the top of the handrail baffles on both sides and a pair of low projection lights located at the skirts on both sides, where the pair of high projection lights project the first longitudinal light beam and the second longitudinal light beam, respectively, and the pair of low projection lights jointly project the transverse light beam.

5. The automatic conveyor device according to claim 1, wherein the first warning device and/or the second warning device further comprise a display device disposed at the handrail baffle, wherein when the first warning device and/or the second warning device are activated, the display device plays an animation consisting of at least three frames in a loop, where the animation displays an action of a foot stepping across the comb plate.

6. The automatic conveyor device according to claim 5, wherein, in a first frame of the animation, the foot is on the ground and in front of the comb plate;

in a second frame of the animation, the foot is lifted and substantially aligned with the comb plate; and in a third frame of the animation, the foot is on the ground and behind the comb plate.

7. The automatic conveyor device according to claim 1, wherein the first warning device and/or the second warning device further comprise a light strip with text warnings located on the comb plate or on the handrail baffles on both sides of the comb plate, where when the first warning device and/or the second warning device are activated, the light strip with text warnings is illuminated or blinking.

8. The automatic conveyor device according to claim 1, wherein the first warning device and/or the second warning device further comprise a series of color-changing lights disposed in rows on the comb plate, where when the first warning device and/or the second warning device are activated, the series of color-changing lights are illuminated with color changing at regular intervals.

9. The automatic conveyor device according to claim 1, wherein the first warning device and/or the second warning device further comprise a screen disposed on the comb plate along a width of the comb plate, where the screen displays static or scroll text warnings when turned on.

10. The automatic conveyor device according to claim 1, wherein the first warning device and/or the second warning device comprise an embedded display screen embedded in the entrance platform footboard or the exit platform footboard, the embedded display screen being surrounded by a ring light array, where when the first warning device and/or the second warning device are activated, the embedded display screen is illuminated with text warnings displayed, and the ring light array is illuminated or blinking.

11. The automatic conveyor device according to claim 1, wherein the first warning device and/or the second warning device comprise a sound prompt device, where when the first warning device and/or the second warning device are activated, the sound prompt device broadcasts prompt messages.

12. An automatic conveyor device, comprising:

an entrance platform footboard, an exit platform footboard, and a series of steps running in a loop between the entrance platform footboard and the exit platform footboard;

a first comb plate and a second comb plate respectively connected to the entrance platform footboard and the exit platform footboard through a comb support plate; and a first warning device disposed in the vicinity of the entrance platform footboard or the exit platform footboard, the first warning device comprising a display device disposed on a handrail baffle on one side of the first comb plate or the second comb plate, where when the first warning device is activated, the display device plays an animation consisting of at least three frames in a loop, the animation displaying an action of a foot stepping across the comb plate.

13. The automatic conveyor device according to claim 12, wherein, in a first frame of the animation, the foot is on the ground and in front of the comb plate;

in a second frame of the animation, the foot is lifted and substantially aligned with the comb plate; and in a third frame of the animation, the foot is on the ground and behind the comb plate.

14. The automatic conveyor device according to claim 12, wherein, the first warning device is disposed in the vicinity of the entrance platform footboard, the automatic conveyor device further comprising:

a second warning device disposed in the vicinity of the exit platform footboard;

a first sensor that monitors passengers boarding the automatic conveyor device from the entrance platform footboard; and a controller configured to activate the first warning device based on a signal from the first sensor, and activate the second warning device after a first delay time, where the first delay time is determined based on a distance between the entrance platform footboard and the exit platform footboard and running speed of the steps; or, the controller is configured to activate the first warning device based on a signal from the first sensor, and activate the second warning device based on a signal from the second sensor, where the second sensor monitors passengers about to leave the automatic conveyor device from the exit platform footboard.

15. The automatic conveyor device according to claim 14, wherein, the first warning device and/or the second warning device comprise:

projection devices that project light beams along a width direction in the vicinity of a comb plate of the entrance platform footboard or the exit platform footboard, where the projection devices are disposed at handrail baffles and/or skirts on both sides, and the handrail baffles on both sides are made of transparent materials, where the projection devices, when activated, project a first longitudinal light beam and a second longitudinal light beam extending vertically along the handrail baffles on both sides, and a transverse light beam connected between the first longitudinal light beam and the second longitudinal light beam spanning the comb plate, the first longitudinal light beam, the second longitudinal light beam, and the transverse light beam jointly forming a frame-shaped light beam gate; and/or a light strip with text warnings located on the comb plate or on the handrail baffles on both sides of the comb plate, where when the first warning device and/or the second warning device are activated, the light strip with text warnings is illuminated or blinking; and/or a series of color-changing lights disposed in rows on the comb plate, where when the first warning device and/or the second warning device are activated, the series of color-changing lights are illuminated with color changing at regular intervals; and/or a screen disposed on the comb plate along the width of the comb plate, where the screen displays static or scroll text warnings when turned on; and/or an embedded display screen embedded in the entrance platform footboard or the exit platform footboard, the embedded display screen being surrounded by a ring light array, where when the first warning device and/or the second warning device are activated, the embedded display screen is illuminated with text warnings displayed, and the ring light array is illuminated or blinking; and/or a sound prompt device that broadcasts prompt messages when the first warning device and/or the second warning device are activated.

16. An automatic conveyor device, comprising:

an entrance platform footboard, an exit platform footboard, and a series of steps running in a loop between the entrance platform footboard and the exit platform footboard;

a first comb plate and a second comb plate respectively connected to the entrance platform footboard and the exit platform footboard through a comb support plate;

a first warning device disposed in the vicinity of the entrance platform footboard;

a second warning device disposed in the vicinity of the exit platform footboard;

a first sensor that monitors passengers boarding the automatic conveyor device from the entrance platform footboard; and a controller configured to activate the first warning device based on a signal from the first sensor, and activate the second warning device after a first delay time, where the first delay time is determined based on a distance between the entrance platform footboard and the exit platform footboard and running speed of the steps;

wherein, the first warning device and/or the second warning device comprise:

projection devices that project light beams along a width direction in the vicinity of the first comb plate and/or the second comb plate, wherein the projection devices are disposed at handrail baffles and/or skirts on both sides, and the handrail baffles on both sides are made of transparent materials, where the projection devices, when activated, project a first longitudinal light beam and a second longitudinal light beam extending vertically along the handrail baffles on both sides, and a transverse light beam connected between the first longitudinal light beam and the second longitudinal light beam spanning the comb plate, the first longitudinal light beam, the second longitudinal light beam, and the transverse light beam jointly forming a frame-shaped light beam gate.

17. The automatic conveyor device according to claim 16, wherein, the first warning device and/or the second warning device comprise:

a display device disposed on the handrail baffle on one side of the first comb plate and/or the second comb plate, where when the first warning device is activated, the display device plays an animation consisting of at least three frames in a loop, the animation displaying an action of a foot stepping across the comb plate, wherein, in a first frame of the animation, the foot is on the ground and in front of the comb plate;

in a second frame of the animation, the foot is lifted and substantially aligned with the comb plate; and in a third frame of the animation, the foot is on the ground and behind the comb plate.

* * * * *